Feb. 25, 1941.    L. O. BECKER    2,233,091
RATCHET STRUCTURE
Filed Aug. 3, 1940
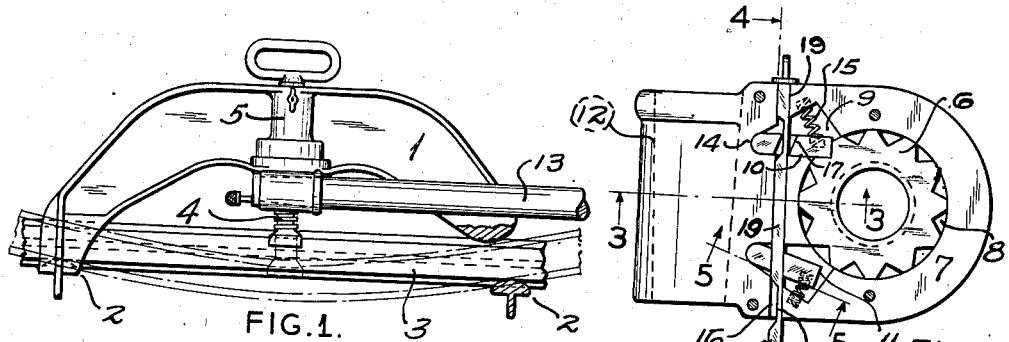
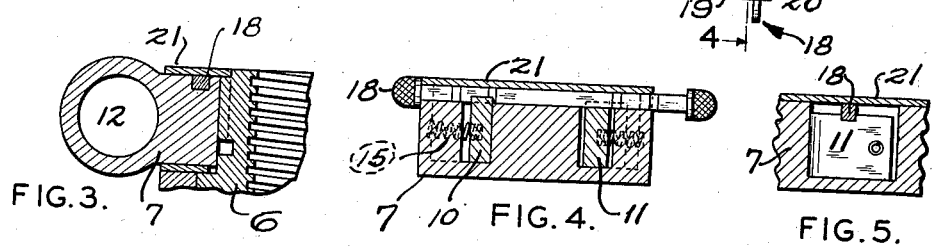
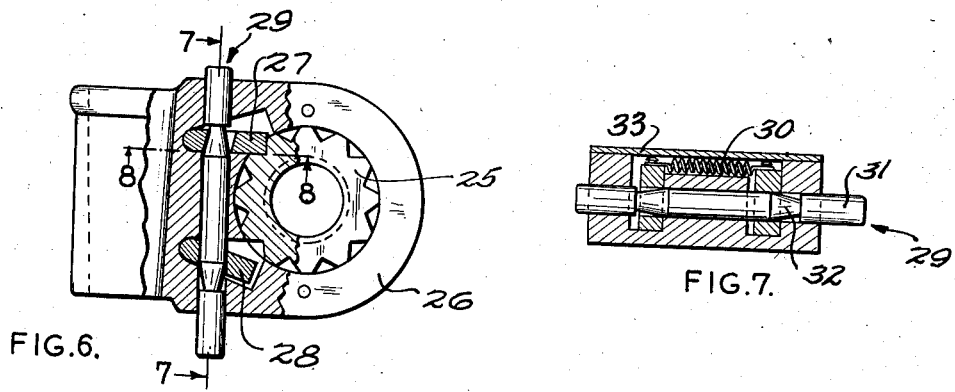
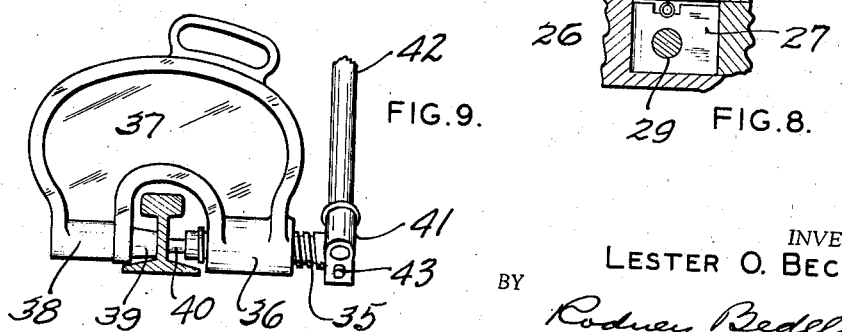
INVENTOR.
LESTER O. BECKER
BY Rodney Bedell
ATTORNEY.

Patented Feb. 25, 1941

2,233,091

UNITED STATES PATENT OFFICE 2,233,091

RATCHET STRUCTURE

Lester O. Becker, St. Louis, Mo., assignor to Joseph Pavelka, St. Louis, Mo.

Application August 3, 1940, Serial No. 350,573

5 Claims. (Cl. 74—157)

The invention relates to ratchet devices in which a pawl element is thrust into engagement with a tooth element or is held out of such engagement, as desired by the operator.

Reference is made to an earlier application by the present inventor filed April 27, 1938, Serial No. 204,559, on a Rail bender, which application discloses and originally claimed subject matter claimed in the present application, the latter being in part a continuation of said earlier filed application.

One object of the present invention is to protect the pawl and tooth parts from dirt or injury by enclosing these parts in a suitable housing.

Another object of the invention is to simplify the structure and assembly of the pawl and tooth elements and to simplify the shifting of the pawl into and out of engagement with the tooth element.

These and other detail objects of the invention as pointed out below are attained in the structure illustrated in the accompanying drawing, in which—

Figure 1 is a top view of a rail bending device in which thrust is applied to the rail by a screw jack device operated by a ratchet structure embodying the present invention.

Figure 2 is a top view of the ratchet members and associated parts with a cover plate therefor removed.

Figures 3, 4 and 5 are detail sections taken on the corresponding section lines of Figure 2.

Figure 6 corresponds generally to Figure 2 but illustrates another form of the invention.

Figures 7 and 8 are detail sections taken on the corresponding section lines of Figure 6.

Figure 9 is a view similar to Figure 1 but shows the invention applied to another tool; namely, a rail punch.

The tool illustrated in Figure 1 comprises a frame 1 with widely spaced jaws 2 for engaging one side of a rail 3. A jack screw 4 is slidable axially in a chamber 5 in frame 1 and is projected from or retracted into the chamber by the rotation of a threaded nut 6 (Figure 2) forming the driven member of the ratchet mechanism.

The driving member of the ratchet mechanism includes a body part 7 provided with a circular aperture 8, receiving nut 6, and provided with recesses 9 opening off of recess 8, for receiving the ratchet pawls 10 and 11, and provided with a socket 12 for receiving a lever 13 by which the body may be oscillated.

Each pawl is pivotally seated at one end in an arcuate portion 14 of its recess 9 and at its opposite end is adapted to engage the nut teeth. Each pawl is provided with a spring 15 tending to thrust the pawl into engagement with the nut teeth.

An elongated passageway 16 extends from side to side of body 7 and each pawl has a passageway 17 which will be fully aligned with passageway 16 when the pawl is moved out of engagement with the nut teeth, as shown by pawl 11, or may be moved as shown by pawl 10 so that the pawl passageway extends diagonally of the body passageway although the opposite ends of the pawl passageway are not wholly offset from the adjacent portions of the body passageway. An operating pin 18 extends through passageways 16 and 17 and has portions 19 of maximum thickness which will snugly fit the passageways and other portions 20 of reduced thickness which, when extending through the pawl passageways, permit the pawls to pivot on their seats 14 so as to move to the position indicated by pawl 10. When a thicker portion 19 of the pin is projected through the pawl passageway, then, because of the fit between the pin and the pawl passageway, the pawl will be held out of engagement with the nut teeth as indicated by pawl 11. Pin portions 19 and 20 are so spaced relative to each other and relative to the distance between the pawls that only one pawl may engage the nut teeth at the same time. Pin 18 projects at both sides of body 7, and the pin is readily shifted axially by manual pressure from the position shown in Figure 2 to release pawl 11 from the retracted position shown and to engage and move pawl 10 to a similar retracted position, thus providing for the selective positive drive of the toothed nut in either direction desired and for the free riding of the driving member over the nut in the opposite direction.

A cover plate 21 is applied to body 7 and overlies the face of the nut and the top of pin 18 and cooperates with the recesses in body 7 to form an enclosed housing for the pawl mechanism.

Figures 6, 7 and 8 illustrate another form of the invention embodying a tooth threaded nut 25, a housing member 26, pawls 27 and 28 and a control pin 29 arranged generally similar to the structure previously described, but instead of the pin being of rectangular cross section and slidable in recesses in the side of the body member and pawls, the pin is of round stock and is inserted through substantially cylindrical passageways extending through the body member and the pawls intermediate their upper and lower faces. The pawls are yieldingly thrust into engagement with the teeth by a common spring 30 having its ends secured to respective pawls.

The normal-diameter portions 31 of the pin fit snugly in the passageways in the body and in the pawls to hold the latter out of engagement with the nut teeth, but the reduced-diameter portions 32, when aligned with one of the pawls, permits the latter to pivot about its seat in the housing to move into engagement with the toothed nut. A cover plate 33 completes the housing structure and prevents disassembly of the parts.

In both forms of the invention the teeth, pawls, pawl springs and the pawl engaging portion of the pawl shifting element are completely enclosed and protected from injury from external sources and are substantially protected from dirt, etc. In both forms of the invention the parts may be assembled or disassembled, when the cover plate is removed, by manually pressing both pawls into tooth disengaged position. In the form of the invention shown in Figures 2–5, the pin must be lifted from the rest of the ratchet structure transversely of its length. In the form of the invention shown in Figures 6, 7 and 8, the pin may be withdrawn longitudinally from the rest of the structure.

It will be understood that the ratchet structure is capable of use otherwise than in rail benders and Figure 9 illustrates its application to a rail punch in which the engaged teeth are part of or rigid with a rotatable screw 35 threaded into one arm 36 of a frame member 37, the other arm 38 of which holds a die 39 for receiving the point 40 of a punch movable by screw 35. The ratchet housing 41 may be oscillated in either direction by lever 42 according to the setting of the control pin 43.

The details of the structure may be varied otherwise than as shown without departing from the spirit of the invention, and the exclusive use of such modifications as come within the scope of the claims is contemplated.

What is claimed is:

1. In a ratchet structure, a driven member having a series of teeth, a relatively rotatable driving member having spring-pressed pawls disposed to engage opposite sides of said teeth respectively whereby said driven member may be moved selectively in opposite directions, there being passages through said pawls, and an element shiftable in said passages and having different cross sections at different portions movable through said passages whereby it may engage and clear, respectively, the sides of said passages in a selected one of said pawls to hold the pawl out of engagement with said ratchet teeth and to permit the other of said pawls to move into engagement with said ratchet teeth.

2. In a ratchet structure of the class described, a driven member having peripheral teeth, an oscillatable drive member surrounding said driven member and having spaced recesses facing said teeth and having a passageway extending transversely of said recesses, pawls loosely seated in said recesses and having transverse openings aligned with said passageway, spring means thrusting said pawls towards said teeth, and a bar slidable in said passageway and openings, and having a relatively thick portion and relatively thin portion, said thick portion being adapted to fill the opening in one of said pawls to hold the same out of tooth engaging position and said thin portion then extending through the opening in the other said pawl and providing for relative movement of the pawl to permit the pawl to be thrust into tooth engaging position by said spring means.

3. In a ratchet structure, a rotatable driven member provided with a series of teeth, a block surrounding said teeth and having a continuous straight-line passage from side to side spaced from said teeth, recesses in said block on opposite sides of its axis, a pair of pawls in said recess, each having one end projectable from its recess towards said teeth and with its other end pivotally seated on the inner wall of its recess, there being a transverse passageway in each of said pawls communicating with said block passageway, spring means normally thrusting said pawls with their passages at an angle to said block passageway to project said pawls towards said teeth, and a bar slidable through all of said passageways and having a thickened portion adapted to substantially fill said passageways and tending, when inserted in one of said pawls, to align its passageway with block passageway and hold that pawl out of tooth engaging position, said bar having a thinner portion which, when in the pawl, permits the pawl to be turned by said spring means to tooth engaging position.

4. In a ratchet structure, a driven member having a series of teeth, a driving member including a pawl shiftable therein to engage and disengage said teeth, spring means normally thrusting said pawl into engagement with said teeth, there being a passage through said driving member and pawl, and an element shiftable manually in said passage to a stable position in which it holds said pawl against the thrust of said spring out of engagement with said teeth and to another stable position in which it releases said pawl to engage said teeth under the thrust of said spring.

5. A structure as described in claim 4 in which the pawl has a pivotal bearing at one end and a tooth-engaging portion at the other end and the axis and sides of the passageway extend diagonally of the length of the pawl between said ends, a portion of the pawl holding element fitting snugly in the pawl passageway to hold the pawl out of engagement with the tooth and another portion of said element clearing said sides to permit the pawl to pivot relative to said element.

LESTER O. BECKER.